United States Patent [19]

Takahata

[11] Patent Number: 4,610,533

[45] Date of Patent: Sep. 9, 1986

[54] AUTOMATIC DOCUMENT FEEDING DEVICE

[75] Inventor: Naomi Takahata, Yokohama, Japan

[73] Assignee: Canon Kabushiki Kaisha, Tokyo, Japan

[21] Appl. No.: 710,938

[22] Filed: Mar. 13, 1985

Related U.S. Application Data

[63] Continuation of Ser. No. 338,377, Jan. 11, 1982, abandoned.

[30] Foreign Application Priority Data

Jan. 20, 1981 [JP] Japan ................... 56-7021
Jan. 21, 1981 [JP] Japan ................... 56-8490

[51] Int. Cl.$^4$ .......................... B65H 9/20
[52] U.S. Cl. ................... 355/14 SH; 271/6; 271/227; 271/265
[58] Field of Search .......... 271/3.1, 4, 5, 6, 7, 271/110, 111, 227, 258, 259, 265, 266, 270; 250/234, 239; 355/3 SH, 14 SH; 318/603; 364/143, 144, 146, 147, 569

[56] References Cited

U.S. PATENT DOCUMENTS

| | | | |
|---|---|---|---|
| 3,246,526 | 4/1966 | Dollheimer et al. | 200/61.41 |
| 3,473,035 | 10/1969 | Gardner et al. | 271/265 |
| 3,674,363 | 7/1972 | Baller et al. | 355/3 SH |
| 3,697,063 | 10/1972 | Greenfield et al. | 271/4 |
| 3,741,357 | 6/1973 | Krysiuk et al. | 271/227 |
| 3,747,918 | 7/1973 | Margulis et al. | 271/265 |
| 3,936,041 | 2/1976 | Shiina et al. | 271/110 |
| 3,947,016 | 3/1976 | Horung et al. | 271/111 |
| 4,215,931 | 8/1980 | Tsuda et al. | 355/3 SH |
| 4,231,561 | 11/1980 | Kaneko et al. | 271/4 |
| 4,330,197 | 5/1982 | Smith et al. | 355/5 H |
| 4,360,769 | 11/1982 | Selkay et al. | 318/603 |
| 4,422,751 | 12/1983 | Komiya et al. | 271/110 |
| 4,455,018 | 6/1984 | Colglazier et al. | 271/227 |
| 4,457,506 | 7/1984 | Ashbee et al. | 271/186 |

Primary Examiner—Bruce H. Stoner, Jr.
Assistant Examiner—James E. Barlow
Attorney, Agent, or Firm—Fitzpatrick, Cella, Harper & Scinto

[57] ABSTRACT

There is disclosed an automatic document feeding device provided with a positionally adjustable document detector for adjusting the document stopping position.

5 Claims, 8 Drawing Figures

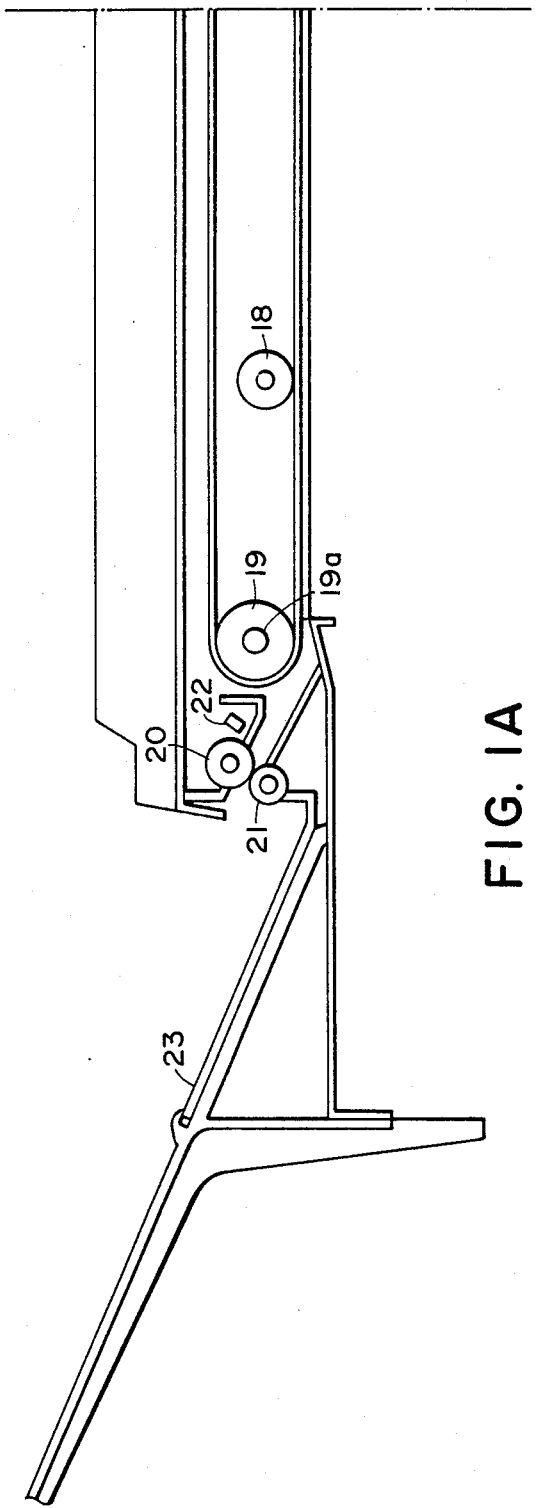

AUTOMATIC DOCUMENT FEEDING DEVICE

This application is a continuation of application Ser. No. 338,377 filed Jan. 11, 1982 now abandoned.

BACKGROUND OF THE INVENTION

1. Field of the Invention

The present invention relates to an automatic document feeding device for feeding original documents to an exposure position and ejecting the original documents from said position in an image forming apparatus such as a copier.

2. Description of the Prior Art

In the known devices of this sort the transportation of the original document is stopped after the counting of clock pulses of a determined number from the detection of the leading end of the document. The stopping position of the original documents therefore fluctuate inevitably due to the incomplete precision in the thickness of a conveyor belt for transporting the original documents or in the dimension of a roller for driving said conveyor belt. Also such fluctuation results from the dimensional irregularity in the mounting mechanism of the copier for mounting the document feeding device. It has been extremely difficult to improve the dimensional precision in the mass production system.

Besides, such automatic document feeding device is generally so constructed that a copy start signal is automatically supplied to the copier for starting the copying operation when a transported original document is stopped on an original support face. Consequently the stopping position of the original document can only be confirmed by observing the copied image. Furthermore the testing of the function of the document feeding device inevitably causes the function of the copier itself, thus producing unnecessary copies.

SUMMARY OF THE INVENTION

The object of the present invention is to provide an automatic document feeding device not associated with the aforementioned drawbacks and capable of adjusting the document stopping position.

Another object of the present invention is to provide an automatic document feeding device adapted for stopping the transportation of the document at a determined time after the detection of said document, wherein the document detecting position is rendered variable for adjusting the document stopping position.

Still another object of the present invention is to provide an automatic document feeding device adapted for stopping the transportation of the document at a determined time after the detection of said document, wherein said determined time is rendered variable for adjusting the document stopping position.

Still another object of the present invention is to provide an automatic document feeding device capable of independent function without causing the function of the image forming apparatus.

The foregoing and still other object of the present invention will be made apparent from the following description of the preferred embodiments.

BRIEF DESCRIPTION OF THE DRAWINGS

FIG. 1 is a diagram showing the positional relationship between FIGS. 1A and 1B.

FIGS. 1A and 1B together show a cross-sectional view of an automatic document. feeding device embodying the present invention;

DETAILED DESCRIPTION OF THE PREFERRED EMBODIMENTS

Now the present invention will be clarified in detail by the following description of the preferred embodiments to be taken in conjunction with the attached drawings.

Figure 1B:
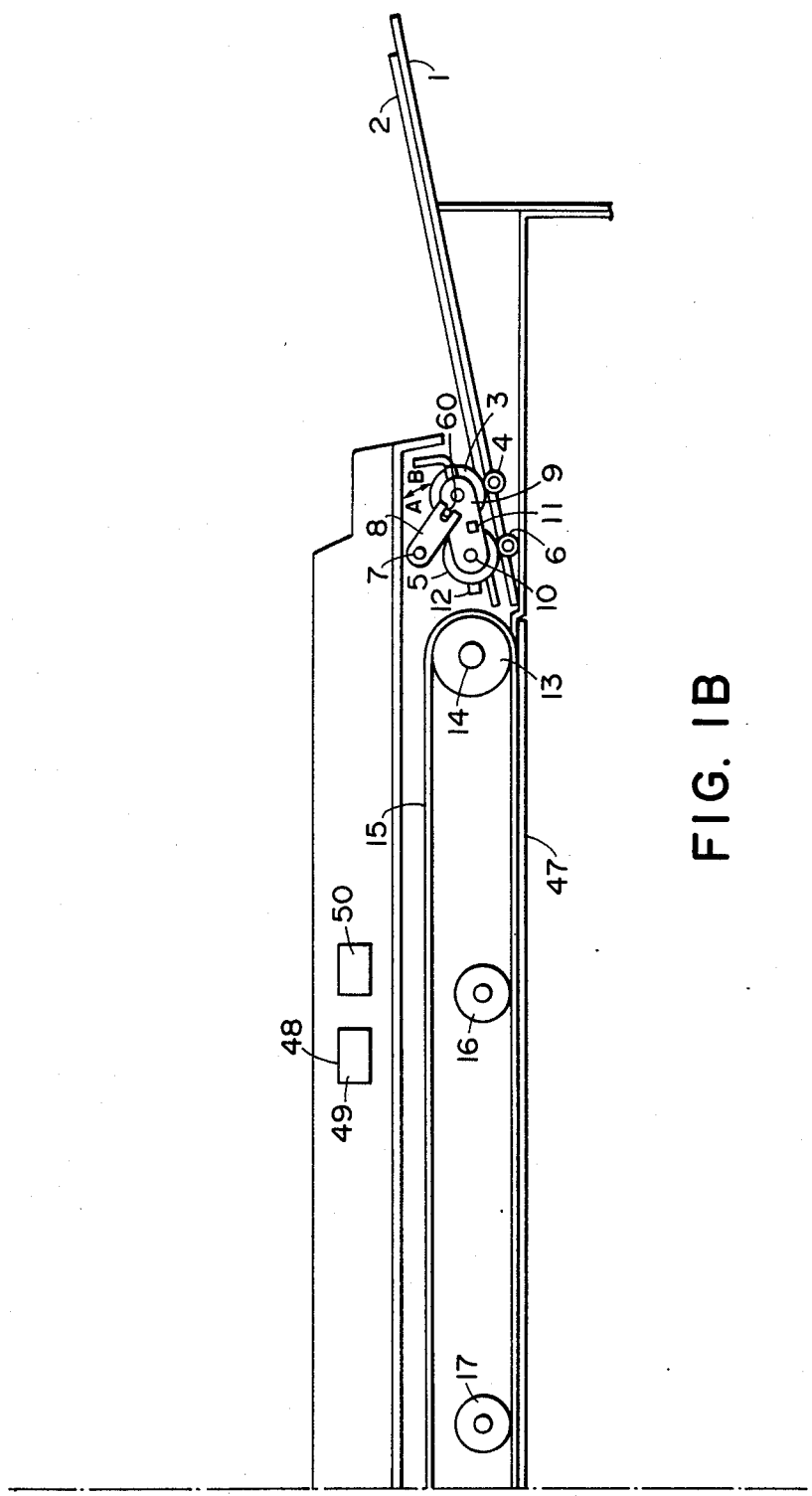

FIG. 1 shows the automatic document feeding device embodying the present invention in a cross-sectional view, wherein an entrance tray 1 supports sheet-formed original documents 2 stacked thereon with image-bearing faces thereof downward. A pick-up roller 3 composed of a material of a high friction coefficient such as rubber oscillates in a direction A-B about a feed roller shaft 10 on which a feed roller 5 composed of the same material as said pick-up roller 3 is fixed and is rotated integrally with said shaft 10. Said rotation is transmitted to the pick-up roller 3 through unrepresented gears in such a manner that said feed roller 5 and said pick-up roller 3 rotate in the same direction with the same peripheral speed. A first transport roller 4 is supported by an unrepresented shaft fixed to the tray 1 in such a manner as to be rotated by the pick-up roller 3 when a sheet document is inserted beteween said pick-up roller 3 and said first transport roller 4 and pinched therebetween.

A second transport roller 6 is slidably supported with a biasing force toward the feed roller shaft 10 and is rotated by the feed roller 5 when a sheet document is pinched between said feed roller 5 and said second transport roller 6. A pick-up arm 8 oscillates about a pick-up arm shaft 7 and is provided at an end thereof with a U-shaped recess, which engages with a shaft 60 fixed to a transport arm 9 oscillating about the feed roller shaft 10. Consequently, an anticlockwise rotation of the pick-up arm shaft 7 causes an anticlockwise oscillation of the pick-up arm 8, also causing a counterclockwise oscillation of the transport arm 9 about the feed roller shaft 10 and lifting the pick-up roller 3 from the first transport roller 4. Then a clockwise rotation of the pick-up arm shaft 7 causes a clockwise oscillation of the pick-up arm 8 thus causing a clockwise oscillation of the transport arm 9 about the feed roller shaft 10 and bringing the pick-up roller 3 in contact with the first transport roller 4, thereby pinching a sheet document therebetween and enabling the feeding thereof.

There are also provided a reflective document sensor 11 for detecting the presence or absence of the sheet document, and a leading edge sensor for detecting the leading edge of the sheet document.

An endless conveyor belt 15 having a width capable of covering the entire area of the sheet document has a surfacial coating composed of a rubber-like material with a sufficient friction coefficient for transporting the sheet document by friction and so treated as to be cleanable for example with alcohol. Said conveyor belt 15 is supported by a drive roller 13 and a roller 19 which is biased toward the left in FIG. 1 through a shaft 19a thereof for maintaining a sufficient tension in said conveyor belt 15 and preventing the slippage between said belt 15 and the drive roller 13. Support rollers 16, 17, 18 are positioned inside said conveyor belt 15 in such a manner that the mutual distance of said rollers as well as the distance between the roller 16 and the feed roller 5 or between the roller 18 and an ejecting roller 20 is slightly smaller than the size of the transportable sheet document. Said rollers 16, 17, 18 press the conveyor belt 15 against a document carriage glass plate 47 with a weak pressure to increase the transporting force during the passage of the sheet document 2 between the glass plate 47 and the conveyor belt 15.

A reflective sheet ejection detecting sensor 22 detects the ejection of the sheet document and lights a sheet jam warning lamp when the sheet document does not pass for a determined period.

The ejecting roller 20, maintained in pressure contact with an ejecting roller 21, ejects the sheet document after the copying operation on the glass plate 47. Said ejecting roller 21 is driven by the moving sheet document. The ejected sheet documents are stacked on an ejected sheet tray 23, and said ejecting roller 21 is cylindrical in shape in order to facilitate sheet stacking on said tray 23.

Figure 2:
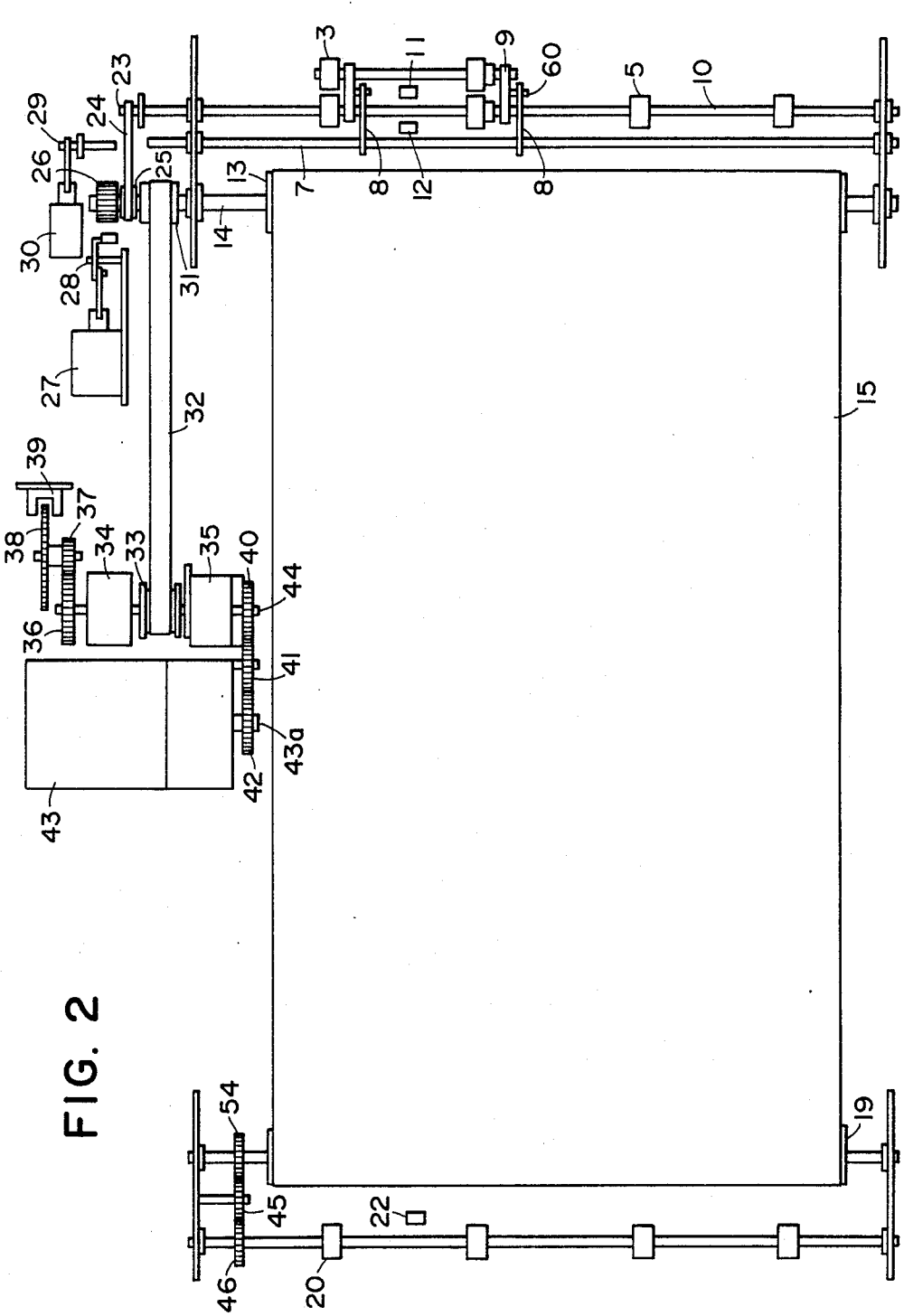
FIG. 2 is a plan view of a drive mechanism for the device shown in FIG. 1.

Now reference is made to FIG. 2 showing an embodiment of the drive mechanism to be applicable in the present invention.

A drive gear 42 fixed on a shaft 43a of a motor 43 transmits the motion of the motor to a gear 40 through an idler gear 41, and the rotation of said gear 40 is transmitted to a clutch shaft 44 through a solenoid clutch 35 when it is energized. A solenoid brake 34 stops the rotation of said clutch shaft 44 when it is energized. A gear 36 fixed on said clutch shaft 44 rotates integrally therewith drives a clock disk gear 37 for rotating a clock disk 38 with an increased speed, said disk being provided on the periphery thereof with small recesses for clock pulse counting by a photointerrupter 39. The rotation of said clutch shaft 44 is also transmitted to a drive roller shaft 14 through a belt 32 provided between a drive pulley 33 fixed on said clutch shaft 44 and a pulley 31 fixed on said drive roller shaft 14. A larger pulley 25 is mounted on the drive roller shaft 14 through an unrepresented spring clutch which turns on and off the transmission of rotation by the actuation of a plunger 27 on a clutch control ring 26 through a lever 28. A smaller pulley 23 mounted on the feed roller shaft 10 through an unrepresented one-way clutch is driven by said larger pulley 25 through a belt 24.

The diameters of said larger and smaller pulleys 25, 23 are so selected that the peripheral speed of the conveyor belt 15 is slightly larger than that of the feed roller 5. Said smaller pulley 23 is one-way coupled with the feed roller shaft 10 in such a manner that the feed roller 5 can follow the movement of the sheet document when it is caught by the conveyor belt 15 and attains the speed thereof. The feed roller 5 and the pick-up roller 3 are mutually linked through gears in such a manner that they rotate in a same direction with the same speed. A plunger 30 is provided for causing oscillating motion of the pick-up arm shaft 7 through a lever 29, thus causing the elevating and lowering motion of the pick-up roller.

The function of the mechanism explained above will be explained in the following.

The sheet documents 2 are stacked on the entrance tray 1, and a document is inserted between the pick-up roller 3 and the transport roller 4. The document is detected by the original sensor 11, and the plunger 30 is energized after a determined period to lower the pick-up roller 3, which is lifted in the absence of the sheet document, thereby pinching said document between the pick-up roller 3 and the transport roller 4. Simultaneously the motor 43 is activated and the clutch 35 is energized to rotate the drive roller 13. In this state, however, the plunger 27 is not yet energized to maintain the larger pulley 25 in the disconnected state through the unrepresented spring clutch, so that the sheet document is not transported. After a determined period from the start of the motor 43, the plunger 27 is energized to lift the lever 28 from the control ring 26, whereby the rotation of the drive roller shaft 14 is transmitted to the feed roller shaft 10, thus initiating the rotation of the feed roller 5 and the pick-up roller 3 and starting the transportation of the sheet document 2. When the leading edge thereof passes between the feed roller 5 and the second transport roller 6 and is detected by the leading edge sensor, the photointerrupter 39 starts to count the clock pulses generated by the clock disk 38. Subsequently the sheet document 2 enters the gap between the conveyor belt 15 and the glass plate 47 and the leading edge reaches a position under the roller 16, whereby the transporting force of the conveyor belt 15 is increased and the sheet document 2 attains the same speed as the peripheral speed of said belt, which is larger than the peripheral speed of the feed roller 5. Thus the feed roller 5 rotates to follow the movement of said sheet document 2. Upon detection of the trailing edge of the sheet document by the sheet sensor 11, the plunger 30 is deactivated to lift the pick-up roller 3. Also upon detection of said trailing edge by the leading edge sensor 12, the plunger 27 is deactivated to terminate the rotation of the feed roller 5 and the pick-up roller 3, thus inhibiting the entry of a succeeding sheet document.

Upon counting of a determined number of clock pulses by the photointerrupter 39 after the detection of the leading edge by the leading edge sensor 12, the motor 43 and the clutch 35 are deactivated and the brake 34 is energized to immediately stop the rotation of the clutch shaft 44, whereby the drive roller shaft 14 and the conveyor belt 15 are immediately stopped to stop the sheet document 2 at a determined position on the glass plate 47. The brake 34 is deactivated after a determined period. Immediately thereafter a copy start signal is supplied to the copier to initiate the copying cycle.

Then, in response to a copy end signal, for example an exposure end signal generated at the reversing of the optical system, supplied from the copier, the motor 43 and the clutch 35 are energized to drive the conveyor belt 15 for ejecting the sheet document 2, which is thus pinched between the ejecting rollers 20, 21 and ejected onto the tray 23. If a following sheet document is detected by the sheet sensor 11, the plunger 27 is energized after the leading edge of the preceding document is detected by the ejection sensor 22, thus advancing said following sheet document in the same manner.

Figure 3:
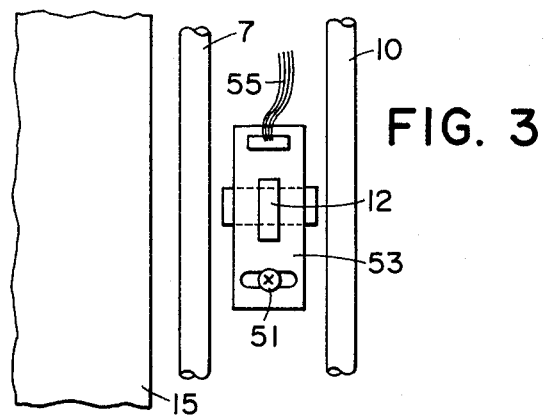
FIG. 3 is a partial magnified view of the mechanism shown in FIG. 2.

FIG. 3 is a magnified view showing the mount method of the leading edge sensor 12, which is integrally mounted on a printed circuit board 53 and is positioned between the pick-up arm shaft 7 and the feed roller shaft 10. The printed circuit board 53 is provided with an oblong mounting hold as shown in FIG. 3 and is therefore positionally adjustable by loosenining a fixing screw 51.

Since the conveyor belt 15 and the sheet document thereon are stopped after the counting of a determined number of peripheral recesses of the clock disk 38 by the photointerrupter 39 from the detection of the leading edge of the sheet document by the leading edge sensor 12 as explained in the foregoing, the stopping position of the sheet document can be adjusted accordingly by displacing said leading edge sensor 12. Also the stopping position can be adjusted by varying the number of clock pulses to be counted.

Figure 4:
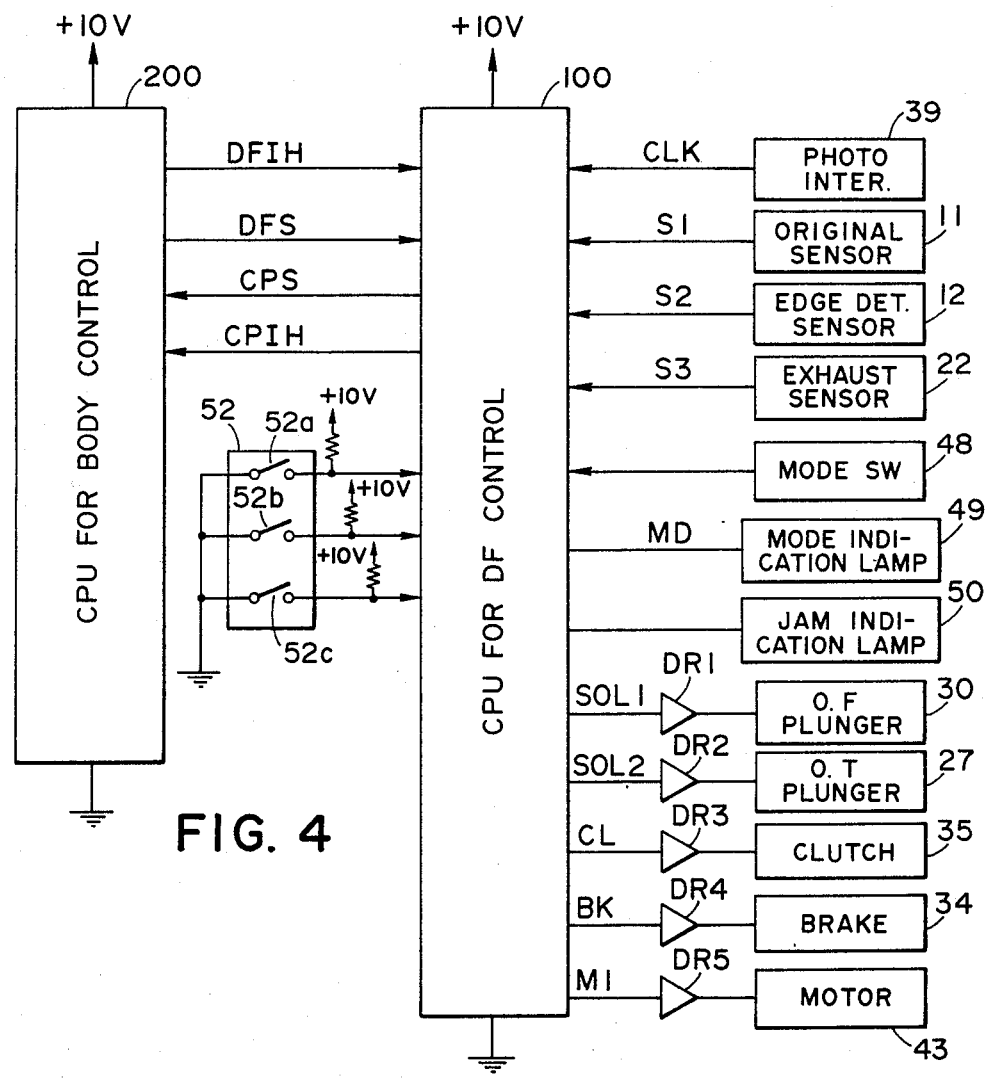
FIG. 4 is a block diagram of a control circuit for use in the present invention.

FIG. 4 shows a control circuit with variable clock pulse count, composed principally of a CPU 200 for controlling the copier and a CPU 100 for controlling the automatic document feeding device (DF-CPU). The DF-CPU 100 and the CPU 200 for main control are already known one-chip microcomputers having RAM, ROM etc. therein and can be composed for example of μCOM43 supplied by NEC.

The DF-CPU 100 transmits a copy start signal CPS and a copy inhibit signal CPIH, generated in case of a sheet jamming in the document feeder, to the CPU 200, which in return transmits a document feeder function inhibit signal DFIH and a document feeder start signal DFS, generated at the end of a copy cycle, to the DF-CPU 100.

Also the DF-CPU 100 receives a clock signal CLK from the photointerrupter 39; document detection signals S1, S2, S3 from the sensors 11, 12 and 22; and a switch state signal from a mode switch 48 for selecting a document automatic feeding mode, and releases a mode display signal MD for lighting a mode indicator lamp 49; a signal for lighting a jam indicator lamp 50; and drive signals SOL1, SOL2, CL, BK, M respectively for the document clamp plunger 30, document transport plunger 27, clutch 35, brake 34 and motor 43 transmitted through drivers DR1-DR5.

Also there is provided a DIP switch 52 having contacts 52a, 52b for changing, when closed, the number of clock pulses from the detection of the leading edge of the sheet document to the stopping thereof as will be explained later, and another contact 52c for enabling, when closed, the function of the document feeder alone without causing the function of the copier. The output signals from said DIP switch 52 are supplied to the DF-CPU 100.

Figure 5:
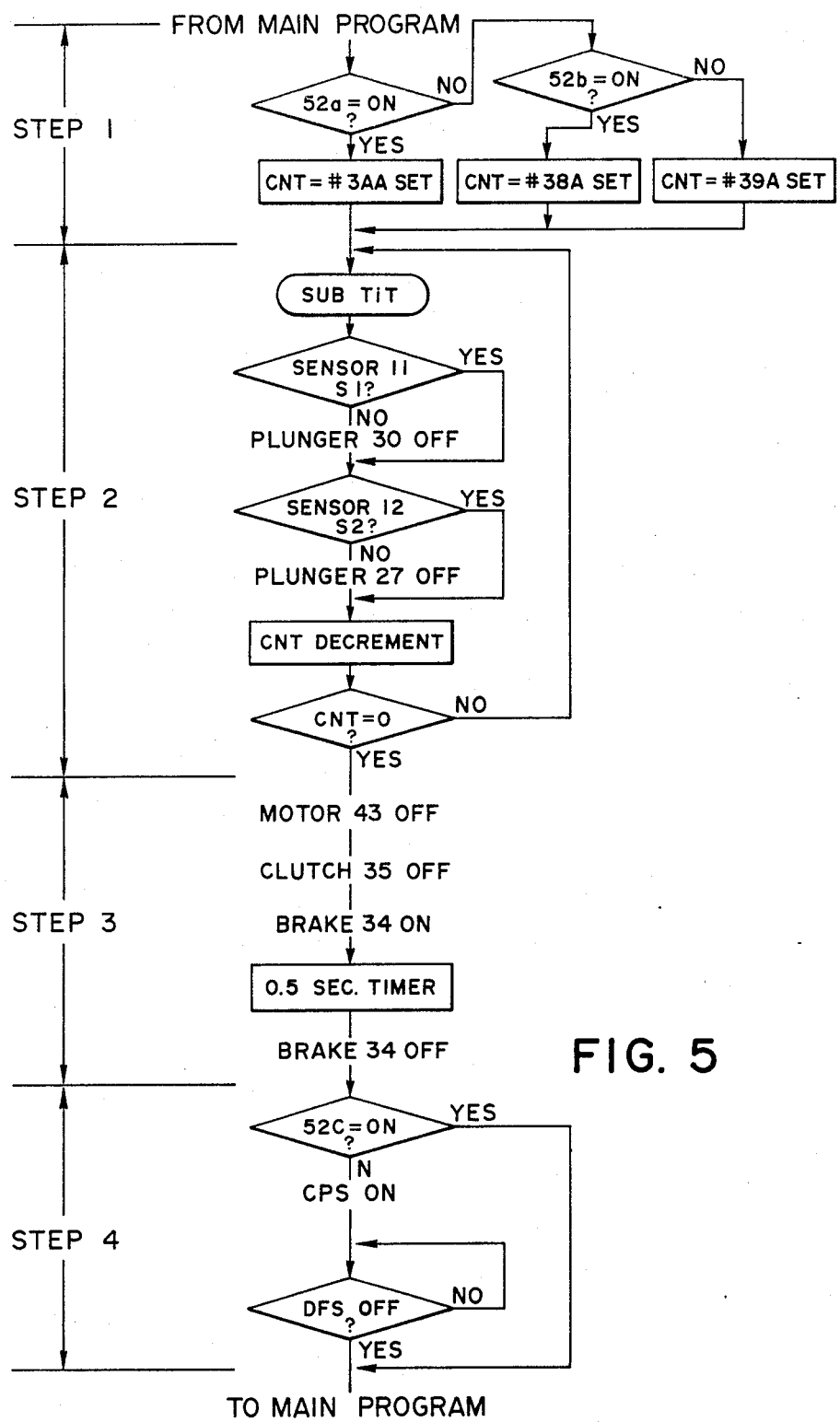
FIG. 5 is a flow chart of a program stored in a CPU for controlling the document feeding device shown in FIG. 4.

The reading of the above-mentioned input signals and the control of various process loads are executed according to a program stored in a read-only memory (ROM) in the CPU 100. FIG. 5 is the flow chart of said program, showing only a part relating to the present invention. Now the function explained in the foregoing will be further clarified in detail in relation to FIGS. 4 and 5.

At first according to a main program abbreviated in FIG. 5, the document feeder start signal DFS is supplied from the copier, and, upon detection of the document by the document sensor 11, the signal S1 is generated to activate the document clamp plunger 30, document transport plunger 27, motor 43 and clutch 35, thus initiating the transportation of the sheet document. Upon detection of the leading edge thereof by the leading edge sensor 12, the signal S2 is generated and the program enters the Step 1 shown in FIG. 5.

The Step 1 determines the number of clock pulses from the clock disk 38 to be counted. More specifically, this step identifies the state of the contacts 52a, 52b of the DIP switch 52, and sets a hexadecimal number #3AA if the contact 52a is closed, or a hexadecimal number #38A if the contact 52B is closed, or a hexadecimal number #39A if both contacts are open, in an unrepresented counter CNT, thus respectively selecting a decimal number 938, 906 or 922 as the number of clock pulses to be counted.

The following Step 2 counts a clock pulse in a subrouting SUBTiT, then stepwise reduces the number set in the Step 1, identifies if the content of said counter CNT in zero, and, if not, repeats the same procedure from the start of the Step 2 until said counter CNT reaches zero. At the same time it inspects the signals from the document sensor 11 and the leading edge sensor 12, and turns off the plunger 30 or 27 respectively when the document is absent at the sensor 11 or 12. Finally the program proceeds to the Step 3 when the counter CNT reaches zero.

The Step 3 immediately turns off the motor 43 and the clutch 35 and activates the brake 34 to interrupt the motion of the conveyor belt 15, thus stopping the sheet document at the determined position. The brake is deactivated after 0.5 seconds, and the program proceeds to the Step 4.

The Step 4 identifies the state of the contact 52c of the DIP switch 52, and, if it is closed, returns the sequence to the main program without releasing the copy start signal CPS, or, if said contact 52c is open, releases the copy start signal CPS to the copier and returns the sequence to the main program after the document feeder start signal DFS from the copier is turned off. Thus, in the function testing of the document feeding device, it is possible to operate the document feeding device alone without causing the function of the copier by closing said contact 52c of the DIP switch 52.

Naturally the DIP switch shown in the foregoing embodiment can be satisfactorily replaced by seesaw switches, toggle switches or shortcircuit bars using jumper wires.

Figure 6:
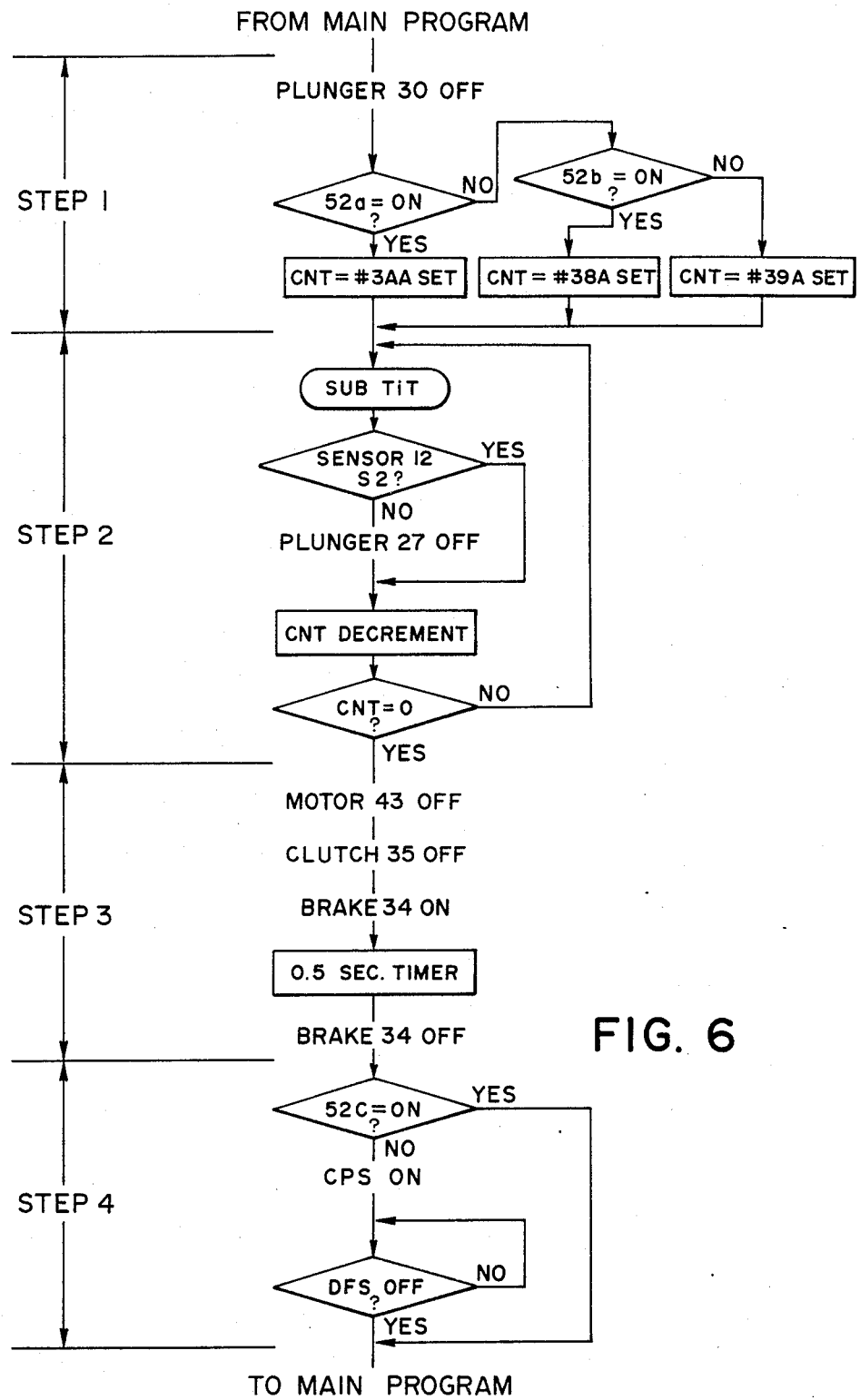
FIG. 6 is a program flow chart representing another embodiment of the present invention.

Also, the plunger 30 in the foregoing embodiment is so structured as to be turned off when the document sensor 11 no longer detects the sheet document, but it is also possible to deactivate the plunger 30 for lifting the roller 3 upon detection of the leading edge of the document by the leading edge sensor 12. FIG. 6 shows the control flow chart in such case, wherein the Step 1 turns off the plunger 30 in response to the detection of the leading edge of the sheet document by the leading edge sensor 12.

In the foregoing embodiment the counting of clock pulses is initiated in response to the detection of the leading edge of the sheet document by the sensor 12, and such method is selected due to the fact that the reference position for the exposure of the original document is positioned at the left-hand side on the exposure surface in the copier shown in FIG. 1. In certain copiers, however, said reference position is at the right-hand side. It will however be obvious that the present invention can be adapted to such case by initiating the counting of clock pulses in response to the detection of the trailing edge of the sheet document by the sensor 12 and stopping the transportation of the document after the count of a number of pulses corresponding to the desired distance of transportation.

As explained in the foregoing, the present invention allows easy adjustment of the stopping position of the sheet document with a simple structure by means of the variable positioning of the document detecting means and/or the variable time measurement in the timer means, thus facilitating mass production process without requiring strict dimensional precision in the belt thickness or the roller diameter. Also the present invention, allowing to operate the document feeding device alone without causing the function of the main apparatus, enables various function tests such as the confirmation of document stopping position without making unnecessary copies.

What I claim is:

1. An automatic feeding device comprising:
   transport means for transporting a sheet document to a predetermined position;
   document detecting means for detecting an edge of the sheet document;
   timer means for activating said transport means for a predetermined period in response to a detection by said document detecting means to transport and stop the sheet document at the predetermined position;
   a manually operable input means;
   control means for causing an image forming operation to be initiated after the sheet reaches the predetermined position and stops at that position;
   regulating means changing the predetermined position; and prohibiting means responsive to an input from said manually operable input means for prohibiting initiation of the image forming operation under control of said control means after the sheet reaches the predetermined position and stops at that position;
   wherein document feeding may be performed without an associated image forming operation.

2. A device according to claim 1 wherein said control means produces a start signal for causing an exposure operation to be initiated, and said prohibiting means prohibits the start signal from said control means.

3. A device according to claim 1 wherein said regulating means includes means for permitting movement of an attached position of said document detecting means, said determined position being regulated by the movement of the attached position of said document detecting means.

4. A device according to claim 1 wherein said regulating means includes means for selecting the predetermined period of said timer means, the predetermined position being regulated by the selection of the predetermined period of said timer means.

5. A device according to claim 4 wherein said timer means includes signal generating means for generating pulse signals in response to the operation of said transport means, and counting means for counting the pulse signals generated from said signal generating means, the predetermined period of said timer means being selected by the selection of the count number of the pulse signals.

* * * * *